United States Patent
Cornelissen et al.

(10) Patent No.: US 10,584,832 B2
(45) Date of Patent: Mar. 10, 2020

(54) LIGHT EMITTING DEVICE COMBINING LIGHT FROM SEVERAL LEDS

(71) Applicant: SIGNIFY HOLDING B.V., Eindhoven (NL)

(72) Inventors: Hugo Johan Cornelissen, Eindhoven (NL); Barry Mos, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/577,764

(22) PCT Filed: May 26, 2016

(86) PCT No.: PCT/EP2016/061894
§ 371 (c)(1),
(2) Date: Nov. 28, 2017

(87) PCT Pub. No.: WO2016/193113
PCT Pub. Date: Dec. 8, 2016

(65) Prior Publication Data
US 2018/0292054 A1    Oct. 11, 2018

(30) Foreign Application Priority Data
May 29, 2015    (EP) .................................. 15169874

(51) Int. Cl.
*F21K 9/61*    (2016.01)
*F21K 9/62*    (2016.01)
(Continued)

(52) U.S. Cl.
CPC .................. *F21K 9/61* (2016.08); *F21K 9/62* (2016.08); *F21K 9/69* (2016.08); *G02B 6/0006* (2013.01);
(Continued)

(58) Field of Classification Search
CPC ........................ G02B 6/0006; G02B 6/0008; G02B 19/0028; G02B 19/0066; G02B 27/1006;
(Continued)

(56) References Cited

U.S. PATENT DOCUMENTS 6,019,493 A * 2/2000 Kuo ........................ F21V 5/008
116/63 R
6,099,156 A * 8/2000 Jenkins .................. B29C 45/561
362/511
(Continued)

FOREIGN PATENT DOCUMENTS

EP          2342593 B1    12/2012
WO    WO2010044030 A1     4/2010
WO    WO2011114265 A1     9/2011

OTHER PUBLICATIONS

J. Chaves, et al., "Combination of Light Sources and Light Distribution Using Manifold Optics", Nonimaging Optics and Efficient Illumination Systems III, Proc. of SPIE, vol. 6338, 2006, pp. 63380M-1 through 63380M-10.
(Continued)

*Primary Examiner* — Arman B Fallahkhair
(74) *Attorney, Agent, or Firm* — Akarsh P. Belagodu

(57) ABSTRACT

A light emitting device (1, 101) comprising a plurality of LEDs (2), each LED (21, 22, 23) of said plurality of LEDs comprising a LED output surface (24, 25, 26) and being arranged to, in operation, emit light from said LED output surface, a light guiding element (3) comprising a light guide input surface (31) being arranged adjacent said LED output surface of each LED of said plurality of LEDs such that said light emitted by said plurality of LEDs is injected into the light guiding element at said light guide input surface, said light guiding element further comprising a light guide output surface (34), said light being injected into the light guiding element at said light guide input surface further being guided
(Continued)

to and emitted from said light guide output surface, and a collimating element (4) made of a transparent material and comprising a first surface section (41) arranged adjacent said light guide output surface and said collimating element being adapted to collimate light emitted from said light guide output surface and injected into said collimating element at said first surface section, the light emitting device further comprising a first reflective element (5) arranged such as to enclose at least said light guiding element at least partially and wherein said collimating element comprises a second surface section (42), wherein the first reflective element is adapted to inject at least a part of light reflected back by the first reflective element into said collimating element at said second surface section.

15 Claims, 9 Drawing Sheets

(51) Int. Cl.
F21K 9/69 (2016.01)
F21V 8/00 (2006.01)
F21Y 115/10 (2016.01)

(52) U.S. Cl.
CPC ......... *G02B 6/0008* (2013.01); *F21Y 2115/10* (2016.08)

(58) Field of Classification Search
CPC ....... G02B 19/143; G02B 27/149; F21K 9/61; F21K 9/62; F21K 9/69; F21K 9/00; F21K 9/20; F21K 9/68; F21V 7/0091; F21V 7/22

See application file for complete search history.

(56) References Cited

U.S. PATENT DOCUMENTS

| | | | | |
|---|---|---|---|---|
| 7,128,431 B2* | 10/2006 | Ludewig | ................ | G02B 6/04 362/23.09 |
| 7,286,296 B2* | 10/2007 | Chaves | ................ | F21S 43/251 359/641 |
| 7,401,947 B2* | 7/2008 | Wanninger | ........... | F21S 48/1154 362/300 |
| 7,611,272 B2* | 11/2009 | Specht | ................ | F21S 41/143 362/555 |
| 8,960,980 B2* | 2/2015 | Tsai | .................... | G02B 6/0008 362/555 |
| 9,052,417 B2* | 6/2015 | Ticktin | ................ | G02B 6/0005 |
| 9,157,595 B2* | 10/2015 | Hager | ................ | F21S 41/143 |
| 10,018,316 B2* | 7/2018 | Chen | .................... | F21S 41/143 |
| 2005/0243570 A1 | 11/2005 | Chaves et al. | | |
| 2008/0074752 A1 | 3/2008 | Chaves et al. | | |

OTHER PUBLICATIONS

A. Cvetkovic, et al., "Etendue-Preserving Mixing and Projection Optics for High-Luminance LEDs, Applied to Automotive Headlamps", Optics Express, vol. 14, No. 26, Dec. 25, 2006, 7 pages.

* cited by examiner

LIGHT EMITTING DEVICE COMBINING LIGHT FROM SEVERAL LEDS

CROSS-REFERENCE TO PRIOR APPLICATIONS

This application is the U.S. National Phase application under 35 U.S.C. § 371 of International Application No. PCT/EP2016/061894, filed on May 26, 2016, which claims the benefit of European Patent Application No. 15169874.3, filed on May 29, 2015. These applications are hereby incorporated by reference herein.

FIELD OF THE INVENTION

The invention concerns a light emitting device comprising a plurality of LEDs, each LED of the plurality of LEDs comprising a LED output surface and being arranged to, in operation, emit light from the LED output surface, and a light guiding element comprising a light guide input surface being arranged adjacent the LED output surface of each LED of the plurality of LEDs such that the light emitted by the plurality of LEDs is injected into the light guiding element at the light guide input surface, the light guiding element further comprising a light guide output surface, the light being injected into the light guiding element at the light guide input surface further being guided to and emitted from the light guide output surface.

BACKGROUND OF THE INVENTION

LED spots comprising multiple LED sources are widely used. Such LED spots, however, are bulky because each source requires an individual collimator. Since the area of the exit surface of the spot is limited, only a limited number of LED collimators will fit.

A possible solution would be to place the individual LED sources very close together and to use a single bigger collimator instead of individual collimators to fill the area of the exit surface more efficiently. This solution, however, is disadvantageous due to the thermal restrictions arising from the heat generation of the LED sources. Consequently, the LED sources need to be placed at some distance from each other for heat spreading reasons. This means that there need to be gaps between the LEDs whereby the area-averaged luminance of the total source is strongly reduced.

US 2008/0074752 A1 describes one attempt at providing a solution to the above mentioned problems in the form of employing an optical manifold such as to combine the light outputs of several LEDs into one common output. The use of an optical manifold, however, leads to very high losses of light as the light is guided from the input surfaces to the output surface of the optical manifold. US 2008/0074752 A1 attempts to solve this problem by providing the legs of the optical manifold leading from each input surface to the output surface as internal collimators and/or by providing square collimators at each input surface of the optical manifold. This solution, however, still exhibits high losses of light from the optical manifold. Furthermore, this solution still requires an individual collimator for each LED source, and therefore does not solve the above problems related to bulkiness. Furthermore, the requirement for an individual collimator for each LED source also leads to high production costs.

WO 2010/044030 discloses an illumination device comprising a light guide that is divided in separate regions, a light emitting device being arranged in each region. The different regions are separated by a partially transparent partition configured such that light with a given wavelength and incident on said partition is partly transmitted and partly reflected, therewith achieving a uniform illumination.

Thus, and further as there is in the market an ever increasing demand for high quality and high intensity light sources, there is still a need for a solution with which a minimum of light is lost as the light from several different LED light sources is combined. Furthermore, there is a need for a solution to the problem related to the bulkiness of the existing devices.

SUMMARY OF THE INVENTION

It is an object of the present invention to overcome this problem, and to provide a light emitting device with which a minimum of light is lost as the light from several different LED light sources is combined, which is smaller and more compact in structure and which is cheaper and easier to produce.

According to a first aspect of the invention, this and other objects are achieved by means of a light emitting device comprising a plurality of LEDs, each LED of the plurality of LEDs comprising a LED output surface and being arranged to, in operation, emit light from the LED output surface, a light guiding element comprising a light guide input surface being arranged adjacent the LED output surface of each LED of the plurality of LEDs such that the light emitted by the plurality of LEDs is injected into the light guiding element at the light guide input surface, the light guiding element further comprising a light guide output surface, the light being injected into the light guiding element at the light guide input surface further being guided to and emitted from the light guide output surface, and a collimating element made of a transparent material and comprising a first surface section arranged adjacent the light guide output surface, the collimating element being adapted to collimate light emitted from the light guide output surface and injected into the collimating element at the first surface section, wherein the light emitting device further comprises a first reflective element arranged such as to enclose at least the light guiding element at least partially and wherein the collimating element comprises a second surface section, wherein the first reflective element is adapted to inject at least a part of light reflected back by the first reflective element into the collimating element at said second surface section.

By providing a light emitting device with a collimating element arranged adjacent the light guide output surface of the light guiding element, only one collimator is needed for collimating the light from the light guide output surface. This in turn provides for a light emitting device which is much more compact in structure and which is cheaper and easier to produce.

By providing a light emitting device with a first reflective element arranged such as to enclose at least the light guiding element at least partially and which is adapted for injecting reflected light at least partly into the collimating element, the light otherwise lost and not being guided by the light guide and transmitted into the collimating element, may be reflected back by the first reflective element and is thus not lost.

By providing the collimating element as a collimating element made of a transparent material and comprising a second surface section, at least a part of said light being reflected back and injected into the collimating element at said second surface section and by further providing the first reflective element, the light that would otherwise be lost by leaking out of the light guiding element may be reflected back into the collimating element and may be used for diffuse background illumination emitted together with the light collimated by the collimating element. Thereby a light emitting device with a high quality high intensity light output is provided.

In an embodiment the area of the light guide input surface is larger than the area of the light guide output surface.

Furthermore, it is in this way obtained that the luminous flux through the exit window diminishes, while the flux per area increases. This is a surprising and unexpected result, since the flux per area is commonly associated with the luminance of the light source which cannot increase in optical designs such as that of the invention. The explanation is believed to be the fact that the angular distribution of the resulting combined light beam is broader than that of the individual sources. This allows more flux to pass the light guide output surface, but at a larger angle than the original source. In other words the explanation is thus believed to be the fact that the beam angle at the light guide output surface is larger than the Lambertian beam angle of the individual LEDs.

In an embodiment the light guiding element comprises at least two light guide input surfaces, each of the at least two light guide input surfaces being arranged adjacent the LED output surface of at least one LED of the plurality of LEDs such that the light emitted by the plurality of LEDs is injected into the light guiding element at the two light guide input surfaces, the light being injected into the light guiding element at each of the two light guide input surfaces further being guided to and emitted from the light guide output surface.

In an embodiment the sum of the areas of the at least two light guide input surfaces of the light guiding element is larger than the area of the light guide output surface. Thereby a light emitting device is provided having the same or similar advantages as those described above.

In an embodiment the first reflective element further is arranged such as to enclose at least one of the plurality of LEDs and the collimating element at least partially. Thereby the loss of light as the light from several different LED light sources is combined in the light guiding element is minimized even further or altogether avoided.

In an embodiment at least one LED of the plurality of LEDs is arranged such that the LED output surface extends in an angle with respect to the adjacent light guide input surface.

In an embodiment the plurality of LEDs is arranged on a carrier, and wherein at least one LED of the plurality of LEDs is arranged such that the LED output surface extends in an angle different from zero with respect to the adjacent light guide input surface.

Any of these two embodiments provides for a light emitting device with which the length of the light guiding element may be reduced while still obtaining a full combination of the light emitted by the plurality of LEDs. This in turn results in an even more compact light emitting device. Arranging the LEDs on a carrier furthermore provides for a more robust light emitting device.

In an embodiment the LEDs are arranged on the carrier by soldering. Thereby, and in particular when the LEDs are arranged such that the LED output surface extends in an angle different from zero with respect to the adjacent light guide input surface by soldering, the LEDs can in a very simple and straight forward manner be arranged in the focal plane of the collimating element such as to obtain improved collimation of the light emitted from the light emitting device.

In an embodiment the carrier is shaped in such a way that at least one LED of the plurality of LEDs is arranged such that the LED output surface extends in an angle different from zero with respect to the adjacent light guide input surface. Thereby a light emitting device is provided with which the arrangement of the LEDs in such a way that the LED output surface extends in an angle, different from zero, with respect to the adjacent light guide input surface may be obtained in a particularly simple and cost efficient manner.

In an embodiment at least two adjacent LEDs of the plurality of LEDs are separated by means of at least one second reflective element.

In an embodiment the at least one second reflective element is mounted around those LEDs that are positioned below the focal plane of the collimating element.

Thereby transport of the emitted light to the focal plane of the collimating element is obtained, which in turn improves the degree of collimation of the light emitted from the light emitting device. Furthermore, the size of the necessary gaps between the LEDs may in this way be reduced even further, thus providing for an even more compact light emitting device.

The second reflective element may e.g. be a mirror, such as a specular minor, but it can also be a white diffuse reflector.

The light guiding element may be an optical manifold or alternatively an optical wedge.

In an embodiment where the light guiding element is an optical wedge the light guiding element comprises a refractive index of at least 1.5 and the area of the light guide output surface amounts to 25% to 64% of the area of the light guide input surface.

In an embodiment where the light guiding element is an optical wedge the light guiding element comprises a refractive index of 1.5 and the area of the light guide output surface amounts to any one of 25% to 64% of the area of the light guide input surface.

In an embodiment where the light guiding element is an optical wedge the light guiding element comprises a refractive index of 1.8 and the area of the light guide output surface amounts to any one of 25% to 49% of the area of the light guide input surface.

It is noted that it is well known that if light is injected into a wedge-shaped (tapered) light guide, some flux will leak out from the side facets. Namely, light that is initially propagating by total internal reflection is redirected by the tilted non-parallel side walls and will escape eventually form the side facets of the light guide. Hence the flux reaching the light guide output surface decreases when the area of the light guide output surface decreases.

However, by carefully considering how the exit flux depends on the light guide output surface the inventors have discovered a surprising effect, which is illustrated in FIG. 10 for a light guide with a refractive index of 1.5 (FIG. 10A) and in FIG. 11 for a light guide with a refractive index of 1.8 (FIG. 11A). In FIGS. 10 and 11 the exit flux (FIGS. 10C and 11C) and flux/output surface area-ratio (FIGS. 10B and 11B), respectively, is plotted as a function of exit area for various source reflectance and wedge shapes. It is shown that the flux indeed decreases with exit area, but initially not linearly at all.

As a result, for a light guide with a refractive index of 1.5, the flux/area increases to a maximum of 145%-127% of the input value when the light guide output surface area is chosen to be 30%-64% of the light guide input surface area, and in particular a maximum of 145% of the input value when the light guide output surface area is chosen to be 49% of the light guide input surface area. This has been shown to hold true for all lengths up to at least 10 mm of the light guiding element.

For a light guide with a refractive index of 1.8 this effect has been shown to be even more significant as the flux/area shows a maximum of 200% at a light guide output surface area of 36% of the light guide input surface area.

The invention further relates to a lamp, a luminaire, or a lighting system comprising a light emitting device according to the invention and being used in one or more of the following applications: digital projection, automotive lighting, stage lighting shop lighting, home lighting, accent lighting, spot lighting, theater lighting, fiber optic lighting, display systems, warning lighting systems, medical lighting applications, decorative lighting applications.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

In FIG. 2A the area of the light guide output surface equals the LED surface area and thus the sum of the area of the three light guide input surfaces. In FIG. 2B the area of the light guide output surface equals ⅔ of the LED surface area and thus ⅔ of the sum of the area of the three light guide input surfaces. In FIG. 2C the area of the light guide output surface equals ½ of the LED surface area and thus ½ of the sum of the area of the three light guide input surfaces.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
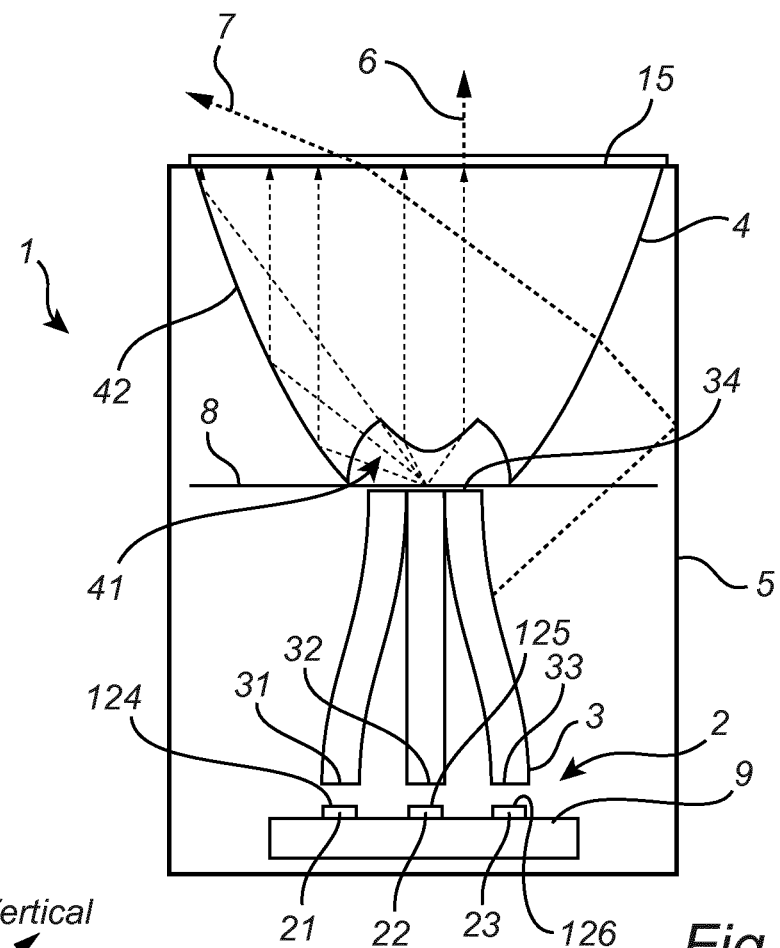
FIG. 1 shows a schematic cross sectional view of a first embodiment of a light emitting device according to the invention.

Referring now to FIG. 1 a light emitting device 1 according to a first embodiment of the invention is shown. The light emitting device 1 comprises a plurality of LEDs 2. In the embodiment shown the plurality of LEDs 2 comprises three LEDs 21, 22 and 23. Alternatively, the plurality of LEDs may comprise two LEDs or four or more LEDs.

The LEDs 21, 22, 23 are each adapted for, in operation, emitting light with a specific spectral distribution. The LEDs may be adapted for emitting light having the same spectral distribution. Alternatively, the LEDs may be adapted for emitting light having different spectral distributions.

Each LED 21, 22, 23 of said plurality of LEDs 2 comprises a LED output surface 124, 125, 126, respectively. The light emitted by the respective LEDs 21, 22, 23, when in operation, is emitted from the respective LED output surfaces 124, 125, 126.

The plurality of LEDs may optionally be arranged on a carrier 9, such as a printed circuit board or a suitable substrate.

The light emitting device 1 further comprises a light guiding element 3 comprising three light guide input surfaces 31, 32, 33. Each light guide input surface 31, 32, 33 is arranged adjacent a LED output surface 124, 125, 126, respectively, of each LED 21, 22, 23 of said plurality of LEDs 2 such that said light emitted by said plurality of LEDs 2 is injected into the light guiding element 3 at the light guide input surfaces 31, 32, 33. The light guiding element 3 further comprises a light guide output surface 34. The light being injected into the light guiding element 3 at the light guide input surfaces 31, 32, 33 is guided to and emitted from the light guide output surface 34. In this way light from each of the LEDs 21, 22, 23 of the plurality of LEDs 2 is combined while being guide through the light guiding element 3 such as to form one common output.

Figure 5:
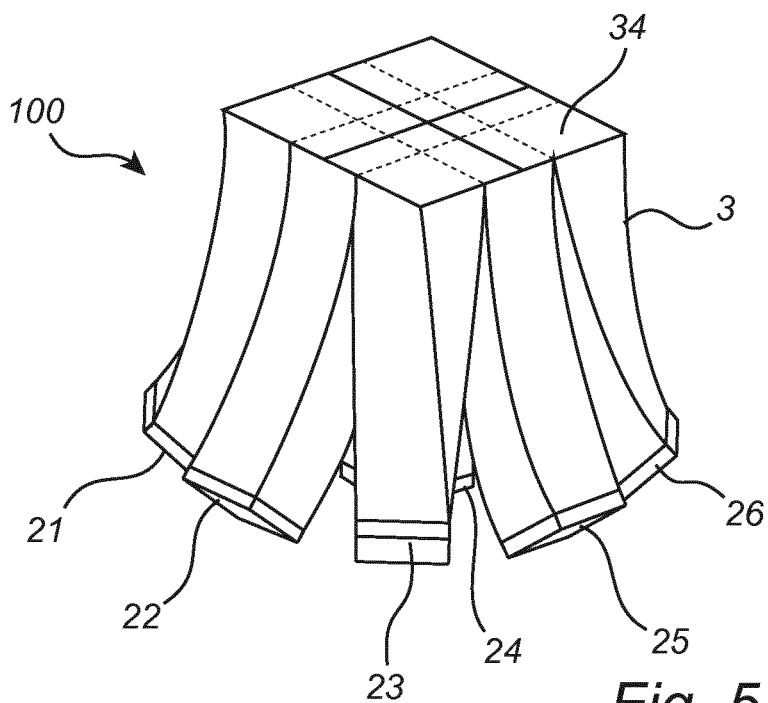
FIG. 5 shows a schematic perspective view of a second embodiment of a light emitting device according to the invention.

Irrespective of the embodiment the LEDs 21, 22, 23 may be arranged such that the LED output surface 124, 125, 126 and the light guide input surface 31, 32, 33 are separated by an air gap, such as shown in FIG. 1, or by a suitable optically transparent material. Still irrespective of the embodiment the LEDs 21, 22, 23 may alternatively be arranged with the LED output surface 124, 125, 126 in physical and/or optical contact with the light guide input surface 31, 32, 33, such as it is shown in FIG. 5, such that such that said light emitted by said plurality of LEDs 2 is injected directly into the light guiding element 3 at the light guide input surfaces 31, 32, 33.

Furthermore, the LEDs 21, 22, 23 in the embodiment shown on FIG. 1 are arranged such that the LED output surface 124, 125, 126 and the light guide input surface 31, 32, 33 are extending in parallel with respect to one another. Alternatively, and irrespective of the embodiment, at least one LED 21, 22, 23 of the plurality of LEDs 2 may be arranged such that its LED output surface extends in an angle different from zero with respect to the adjacent light guide input surface.

In the embodiment of FIG. 1 the light guiding element 3 is an optical manifold comprising three legs, one leg extending from each of the light guide input surfaces 31, 32, 33 to the light guide output surface 34. That is the light guiding element 3 is an optical manifold comprising three legs, one for each LED 21, 22, 23.

Generally the light guiding element may comprise any feasible number of legs, including one as will be described further below. In embodiments where the light guiding element 3 is an optical manifold, the light guiding element 3 comprises a number of legs being equal to or less than the number of LEDs of the plurality of LEDs.

Irrespective of the embodiment, the cross-sectional shape of the light guide input surfaces 31, 32, 33 may be provided to fit the shape of the LED output surfaces 124, 125, 126 of the LEDs 21, 22, 23 so as to capture the light emitted by the LEDs most efficiently. The remaining parts of the light guiding element 3 may thus have any desired cross-sectional shape, such as rounded or rectangular.

In the embodiment illustrated on FIG. 1 the sum of the area of the light guide input surfaces 31, 32, 33 is equal to the area of the light guide output surface 34 of the light guiding element 3.

The light emitting device 1 further comprises a collimating element 4 made of a transparent material and arranged adjacent the light guide output surface 34 of the light guiding element 3. The collimating element 4 is adapted to collimate light emitted from the light guide output surface 34. The collimating element 4 may be a collimating element adapted for collimating light by means of Total Internal Reflection (TIR), refraction or a combination thereof. The collimating element 4 may furthermore be made of a dielectric transparent material.

The collimating element comprises a first surface section 41 arranged adjacent the light guide output surface 34 of the light guiding element 3. The collimating element 4 is adapted to collimate light emitted from light guide the output surface 34 and injected into the collimating element 4 at the first surface section 41. The collimating element 42 further comprises an exit window 15 through which collimated light is emitted from the light emitting device 1. The collimating element 42 further comprises a second surface section 42 which is an at least partially circumferential surface section extending between the first surface section 41 and the exit window 15.

Irrespective of the embodiment the collimating element 4 and the light guiding element 3 may be arranged with the input window 8 of the collimating element in physical and/or optical contact with the light guide output surface 34 such as it is shown in FIG. 1. Still irrespective of the embodiment the collimating element 4 and the light guiding element 3 may alternatively be arranged such that the input window 8 and the light guide output surface 34 are separated by an air gap or by a suitable optically transparent material.

The light emitting device 1 further comprises a first reflective element 5 arranged such as to enclose at least the light guiding element 1 at least partially. The first reflective element 5 is adapted for reflecting light back into said light emitting device 1. At least a part of the light being reflected back into the light emitting device 1 by the first reflective element 5 is injected into the collimating element 4 at the second surface section 42.

In the embodiment shown in FIG. 1 the first reflective element 5 is arranged such as to enclose all of the light emitting device 1 with the exception of the exit window 15 of the collimating element 4. Alternatively, the first reflective element 5 may be arranged such as to enclose the light emitting device 1 partially, e.g. such as to enclose at least one of the light guiding element 3, the collimating element 4, the plurality of LEDs 2 and/or the carrier 9, where present, partially or fully.

The first reflective element 5 may be made of a reflective material, such as a suitable metal, and/or it may be provided with a reflective coating or a mirror coating on a surface facing the interior of the light emitting device 1 in a mounted condition.

EXAMPLE

Figure 2A:
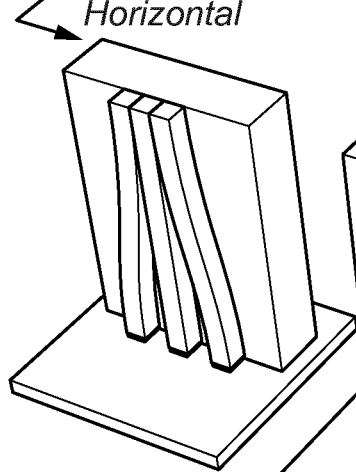
FIGS. 2A, 2B and 2C show schematic views of three different light emitting devices according to FIG. 1 and combining the light of three LEDs.
Figure 2B:
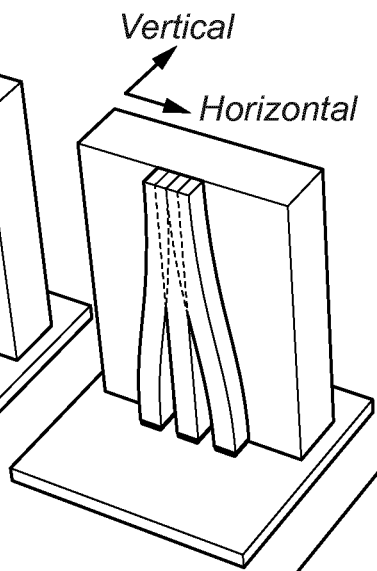
Figure 2C:
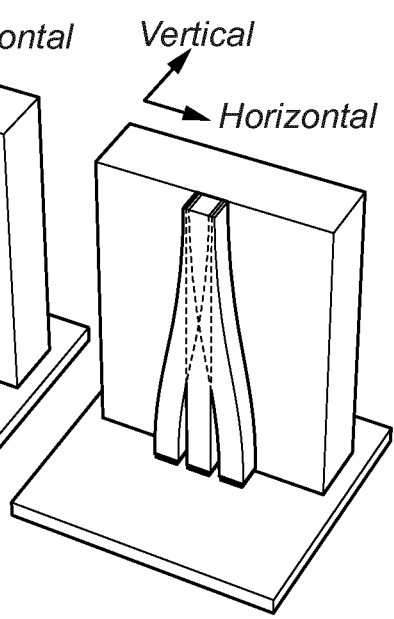

Turning now to FIGS. 2A, 2B and 2C, as a way of a non-limiting example, three different optical manifolds are shown each combining the light of three LEDs. The light guide output surface 34 of the optical manifold is chosen to be equal (FIG. 2A), ⅔ (FIG. 2B) and ½ (FIG. 2C) of the sum of the light guide input surfaces 31, 32, 33, respectively.

Figure 3A:
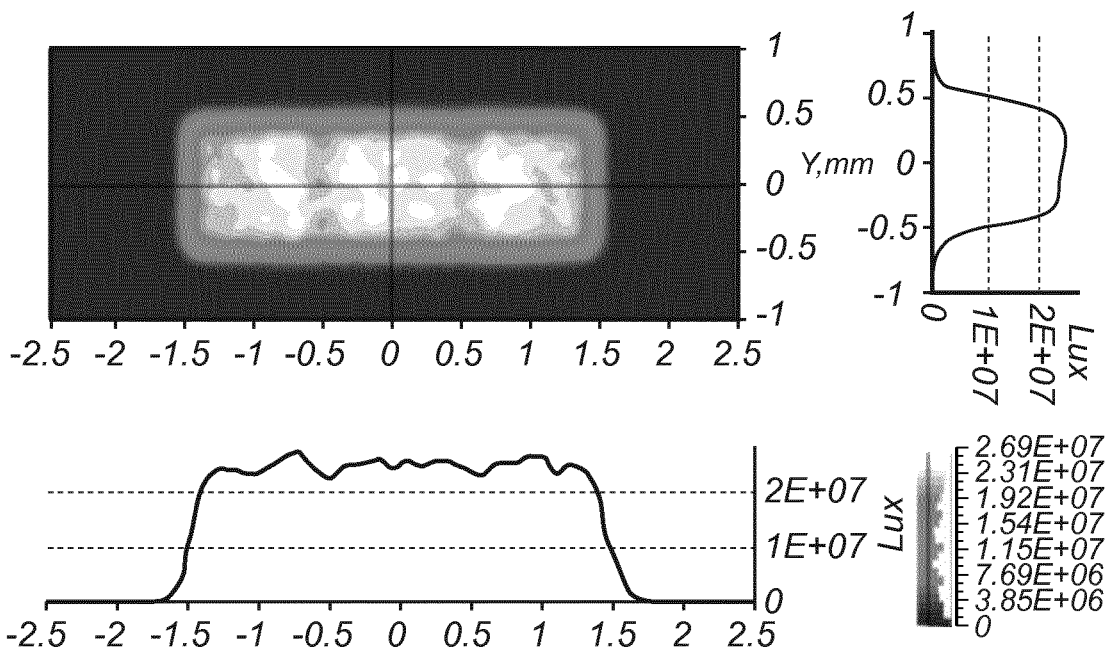
FIGS. 3A, 3B and 3C show the illuminance distribution at the light guide output surface of each of the light guiding elements of the light emitting devices shown in FIGS. 2A, 2B and 2C, respectively.
Figure 3B:
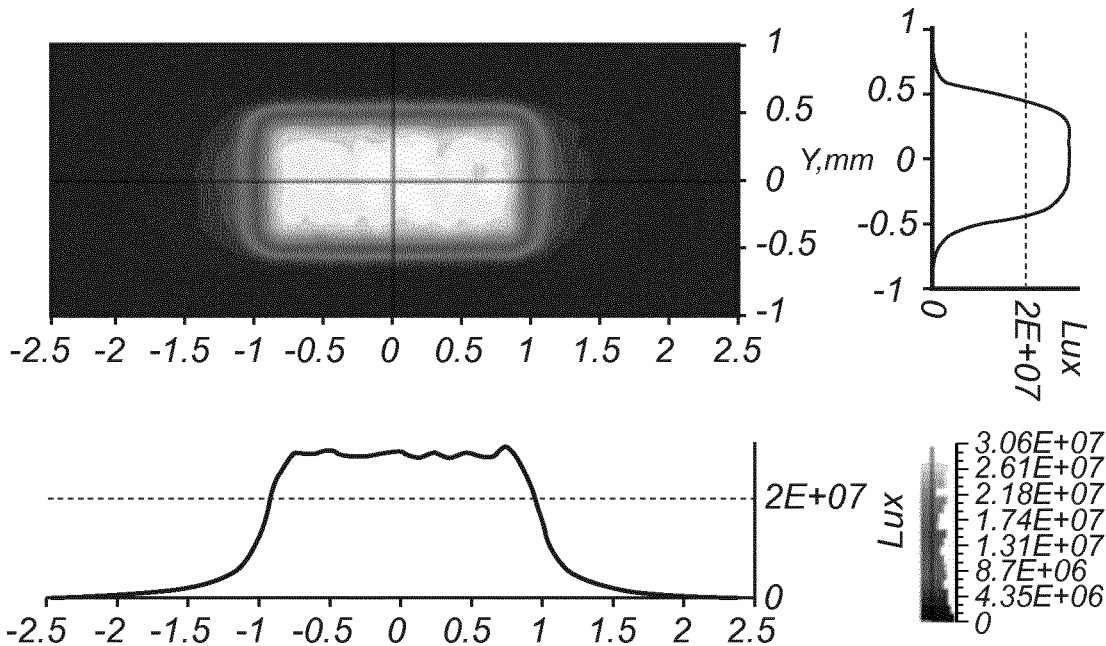
Figure 3C:
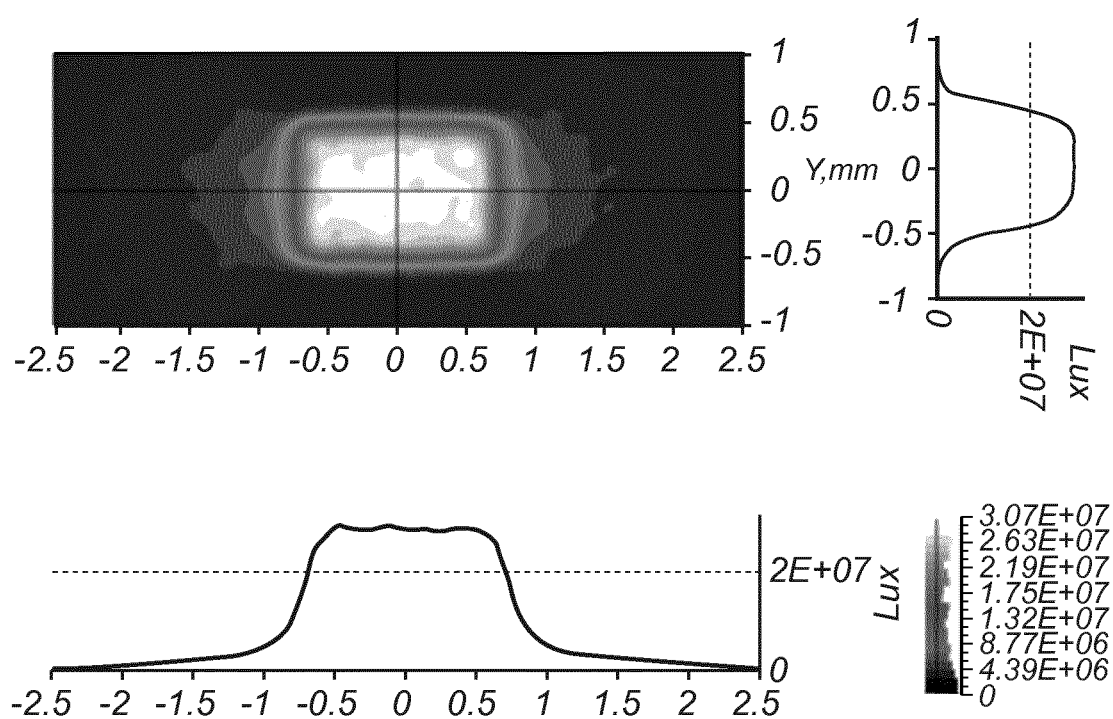

FIGS. 3A, 3B and 3C show the illuminance distribution at the light guide output surface of each of the light guiding elements of the light emitting devices shown in FIGS. 2A, 2B and 2C, respectively. From the optical ray trace analysis, the results of which are shown in FIGS. 3A, 3B and 3C, respectively, it may be seen that the luminous flux through the light guide output surface 34 decreases, in this particular example from 75 lm (FIG. 3A) to 58 lm (FIG. 3B) to 44 lm (FIG. 3C), but the flux per area increases by about 20% from 25 lm/mm$^2$ to about 30 lm/mm$^2$. This is a surprising and unexpected result, since the flux per area is commonly associated with the luminance of the source and this cannot increase in optical designs such as these.

Figure 4A:
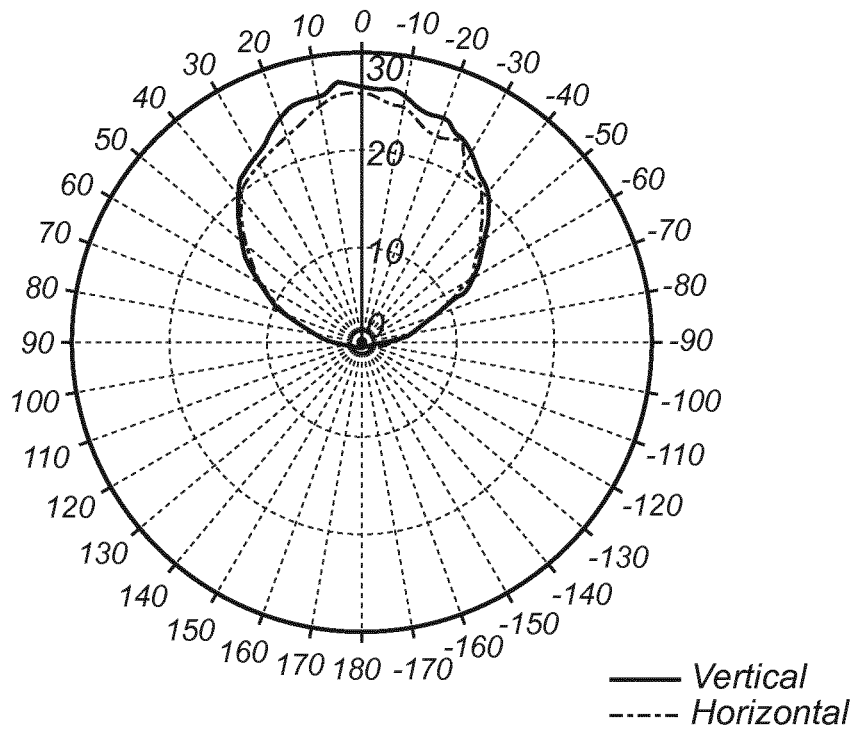
FIGS. 4A, 4B and 4C show the far field intensity distribution of the light emitted by the light emitting devices shown in FIGS. 2A, 2B and 2C, respectively.
Figure 4B:
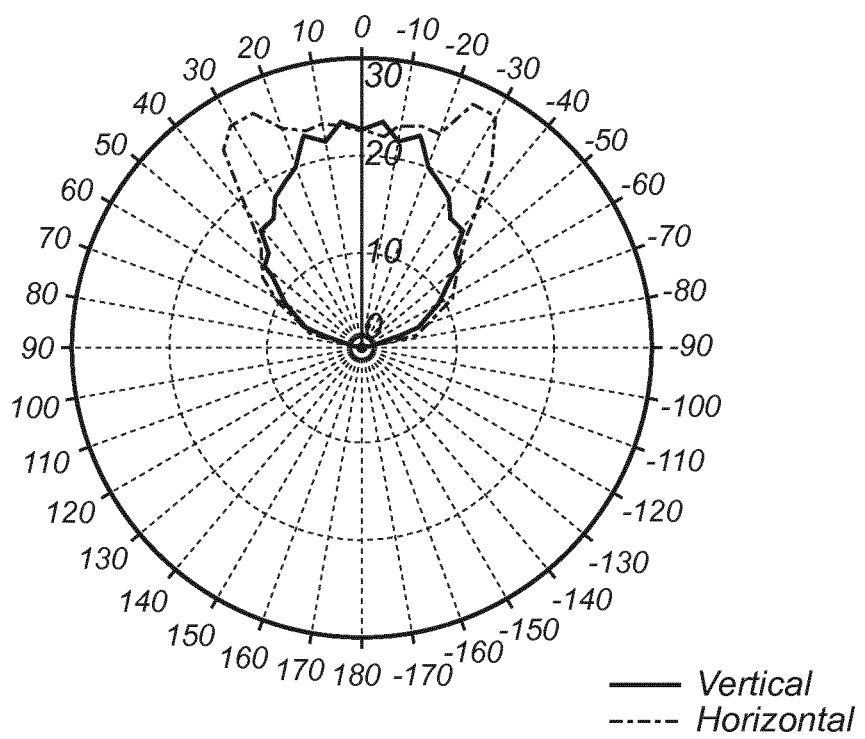
Figure 4C:
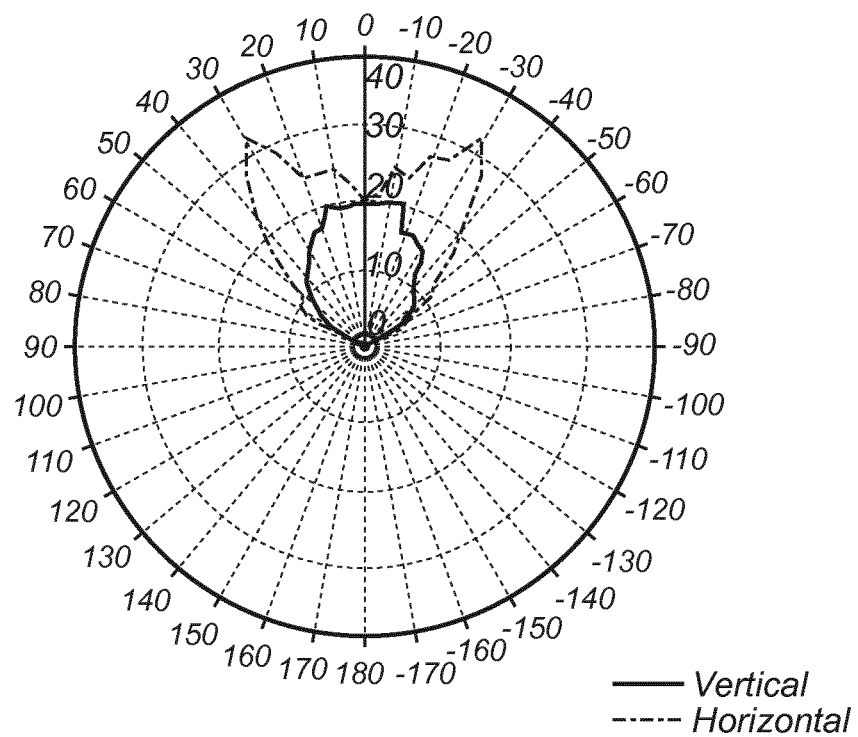

The explanation is believed to be the fact that the angular distribution of the resulting light beam is broader than that of the individual sources, as illustrated in FIGS. 4A, 4B and 4C, respectively, where the far-field (luminous intensity) profile of the light emitted by the light emitting devices shown in FIGS. 2A, 2B and 2C, respectively, is shown (vertical and horizontal, see FIGS. 2A,2B,2C). It is clearly seen that the original Lambertian profile ("circular") transfers to a profile with side lobes ("ears"). This allows more flux to pass the exit window, but at a larger angle than the original source.

The decreased flux through the light guide output surface 34 is caused by flux leaking out of the side walls of the manifold. This light is not lost but can be transmitted through the transparent TIR collimating element from the back side since it is made from transparent dielectric material and functions as a diffuse component 7 in the final light output of the system in addition to the collimated component 8 outputted by the collimating element 4. This is illustrated by way of arrows in FIG. 1.

Turning now to FIG. 5 a second embodiment of a light emitting device 100 according to the invention is shown wherein the collimating element and the reflective element are omitted for the sake of simplicity. The light emitting device 100 differs from that described above in relation to FIG. 1 only in the following.

The light emitting device 100 comprises nine LEDs of which six, namely LEDs 21, 22, 23, 24, 25 and 26, are visible.

The light guiding element 3 comprises nine light guide input surfaces, one for each of the nine LEDs.

The sum of the area of the nine light guide input surfaces is larger than the area of the light guide output surface 34.

Finally, the nine LEDs are arranged with their respective LED output surface in physical and optical contact with a respective one of the nine light guide input surfaces.

Figure 6:
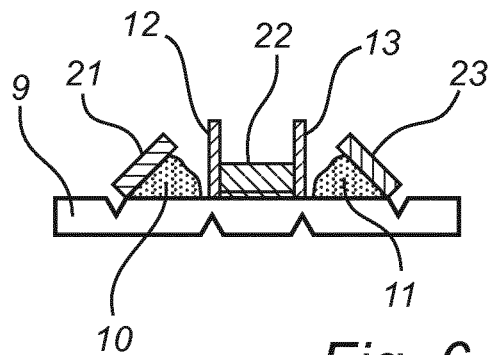
FIGS. 6, 7 and 8 illustrate three different ways of arranging the plurality of LEDs of a light emitting device of the invention on a carrier.
Figure 7:
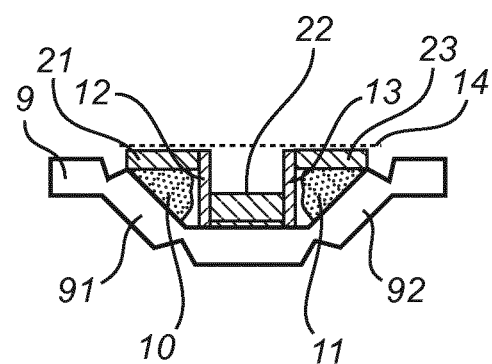
Figure 8:
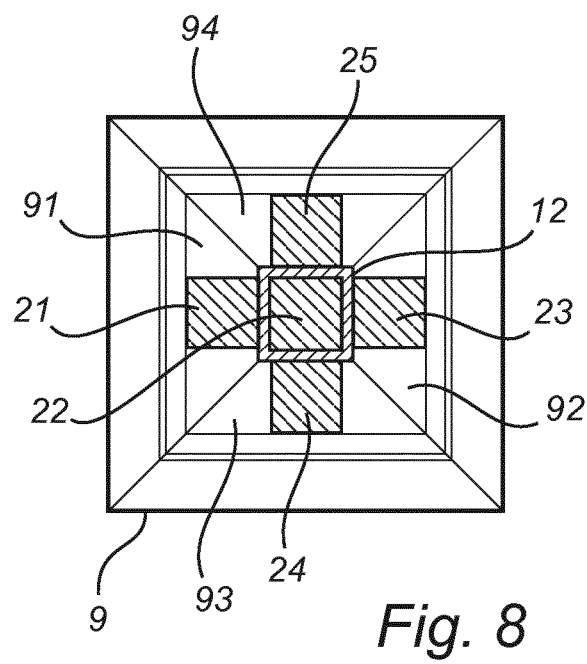

Referring now to FIGS. 6, 7 and 8 different ways of mounting LEDs 21, 22, 23, 24 and 25 on carrier 9 will be described, such as to reduce the gaps between the individual LEDs without compromising electrical connections or thermal management. These possibilities may optionally be combined with the use of a light guiding element 3 in the form of an optical manifold to reduce the gaps even further. Since the gaps between the LEDs are reduced, the manifold may be made more compact.

FIG. 6 shows in cross-section three LEDs 21, 22 and 23 mounted on a carrier 9 by means of soldering. The carrier 9 is flat. The centrally arranged LED 22 is mounted flat on the carrier. The remaining two LEDs 21 and 23 are mounted on the carrier 9 by means of a soldering 10 and 11, respectively, in such a way that their respective LED output surface extends in an angle different from zero with the carrier 9 and thus, when arranged in a light emitting device according to the invention, in an angle different from zero (and hence not parallel) with respect to the adjacent light guide input surface. Furthermore, and optionally, the LEDs 21, 22, 23 may be separated by means of at least one—in FIG. 6 by way of example two—second reflective element 12, 13.

FIGS. 7 and 8 illustrates in cross-section and in a top view, respectively, another way of mounting the plurality of LEDs 2 in such a way that the gaps between the individual LEDs are reduced or even eliminated altogether. In this embodiment the carrier 9 on which the LEDs are soldered is folded such that a number of tilted sections 91, 92, 93 and 94 are obtained. Furthermore, the LEDs 21, 23, 24 and 25 mounted on the tilted sections 91, 92, 93 and 94 are mounted in such a way that their respective LED output surface extends in an angle different from zero with respect to the tilted sections 91, 92, 93 and 94, and thus the carrier 9. Mounting the LEDs in the way illustrated by FIGS. 7 and 8 enables mounting the LEDs in the focal plane 14 of the collimating element. Optionally at least one second reflective element 12 is mounted around that or those LEDs, here the LED 22, that lie below the focal plane 14 to transport the emitted light to the desired plane.

The at least one second reflective element 12, 13 may, irrespective of the embodiment, e.g. be a reflective shield or a minor element, such as a specular minor, or a white diffuse reflector.

Figure 9:
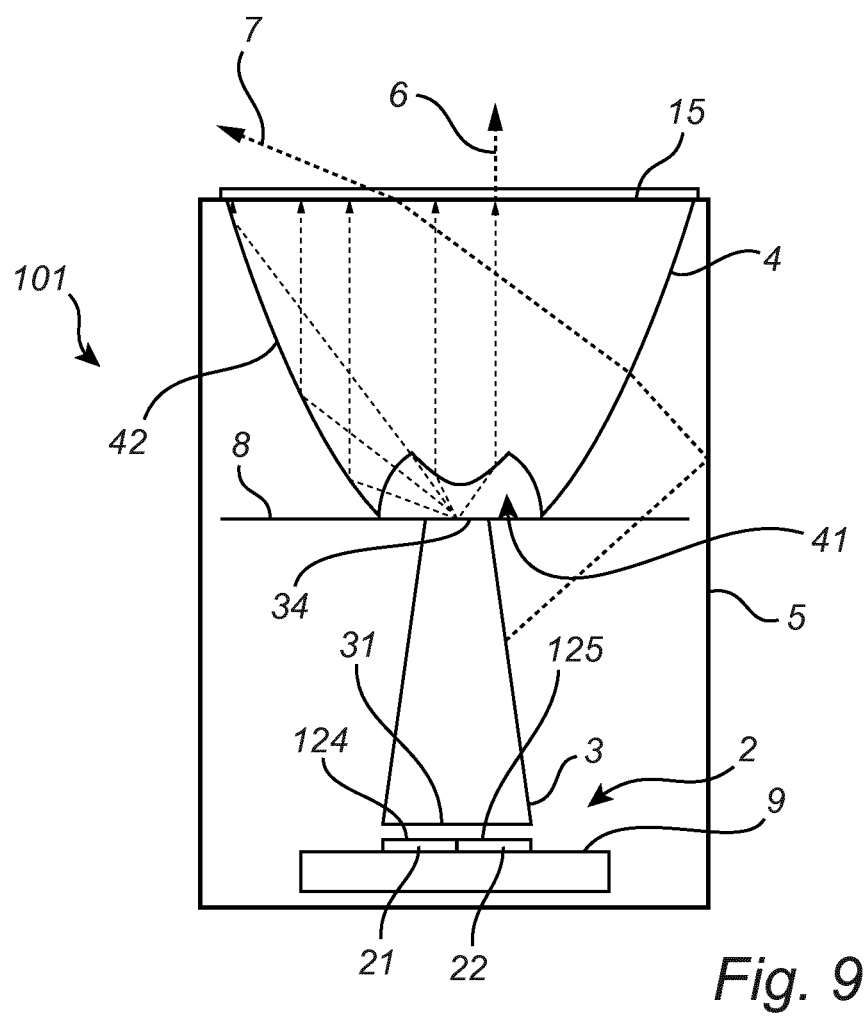
FIG. 9 shows a schematic cross sectional view of a third embodiment of a light emitting device according to the invention, the light guiding element being an optical wedge.

Turning now to FIG. 9 a third embodiment of a light emitting device 101 according to the invention is shown. The light emitting device 101 differs from that described above in relation to FIG. 1 only in the following.

The light guiding element 3 is provided as a wedge-shaped or tapered transparent optical element, also known as an optical wedge, having only one light guide input surface 31 being common to the plurality of LEDs 2, in this example comprising two LEDs 21 and 22. Such a light guiding element 3 may be shaped e.g. as a frustum of a cone or a pyramid.

Thus, the light guiding element 3 shown in FIG. 9 comprises one light guide input surface 31 being arranged adjacent the LED output surfaces 24 and 25 of each LED 21, 22 of the plurality of LEDs 2 such that the light emitted by the plurality of LEDs 2 is injected into the light guiding element 3 at the light guide input surface 31.

The light guiding element 3 further comprises light guide output surface 34, the light being injected into the light guiding element 3 at the light guide input surface 31 further being guided to and emitted from the light guide output surface 34.

Furthermore, the area of the light guide input surface 31 is in this embodiment larger than the area of the light guide output surface 34.

Such a light guiding element 3 may be used to increase the flux/unit area ratio. It is well-known that if light is injected into a wedge-shaped (tapered) light guide, some flux will leak out from the side facets. Namely, light that is initially propagating by total internal reflection is redirected by the tilted non-parallel side walls extending between the light guide input surface 31 and the light guide output surface 34 and will eventually escape from the side walls of the light guiding element 3. The light thus escaping from the side walls of the light guiding element 3 is reflected back into the light emitting device by means of the reflective element 5.

Figure 10A:
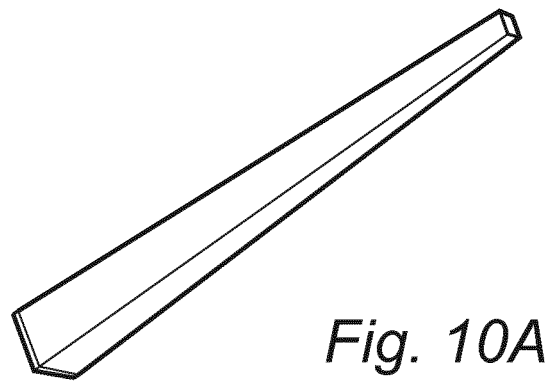
FIG. 10A shows an exemplary optical wedge with a refractive index of 1.5 of a light emitting device according to FIG. 9.
Figure 10B:
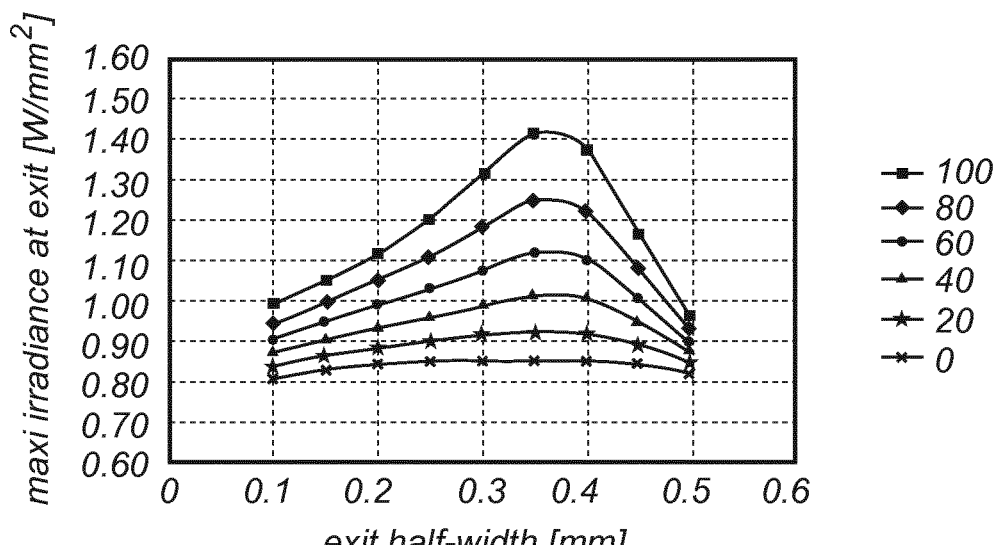
FIG. 10B shows the flux/output surface area-ratio as a function of the light guide output surface area for various source reflectance of the optical wedge of FIG. 10A.
Figure 10C:
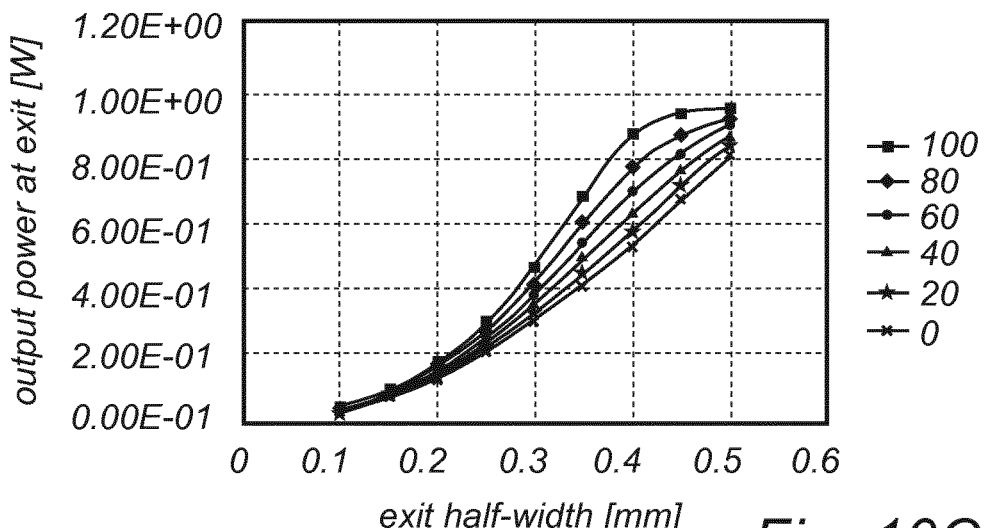
FIG. 10C shows the exit flux as a function of the light guide output surface area for various source reflectance of the optical wedge of FIG. 10A.
Figure 11A:
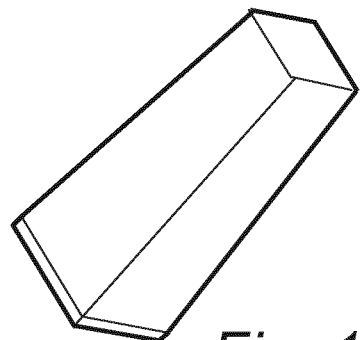
FIG. 11A shows an exemplary optical wedge with a refractive index of 1.8 of a light emitting device according to FIG. 9.
Figure 11B:
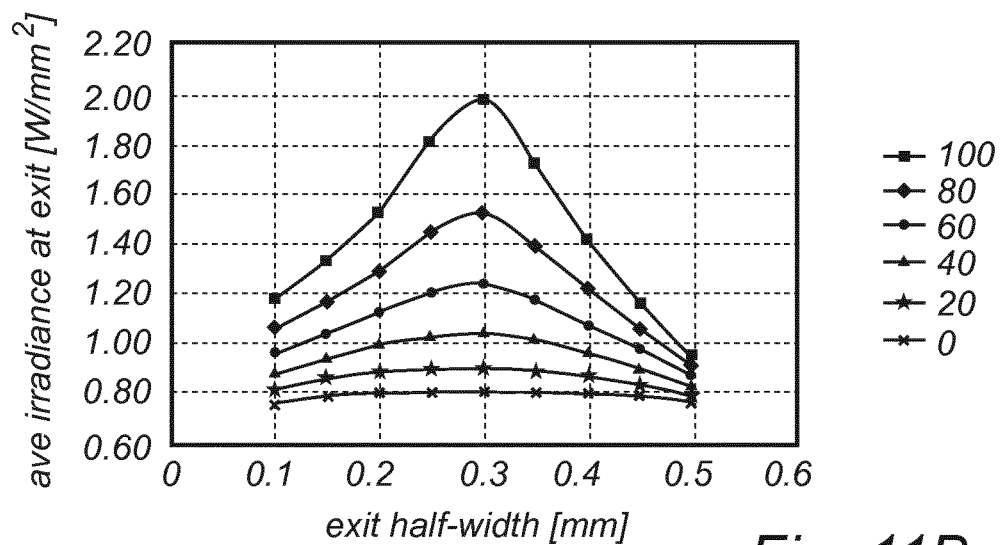
FIG. 11B shows the flux/output surface area-ratio as a function of the light guide output surface area for various source reflectance of the optical wedge of FIG. 11A.
Figure 11C:
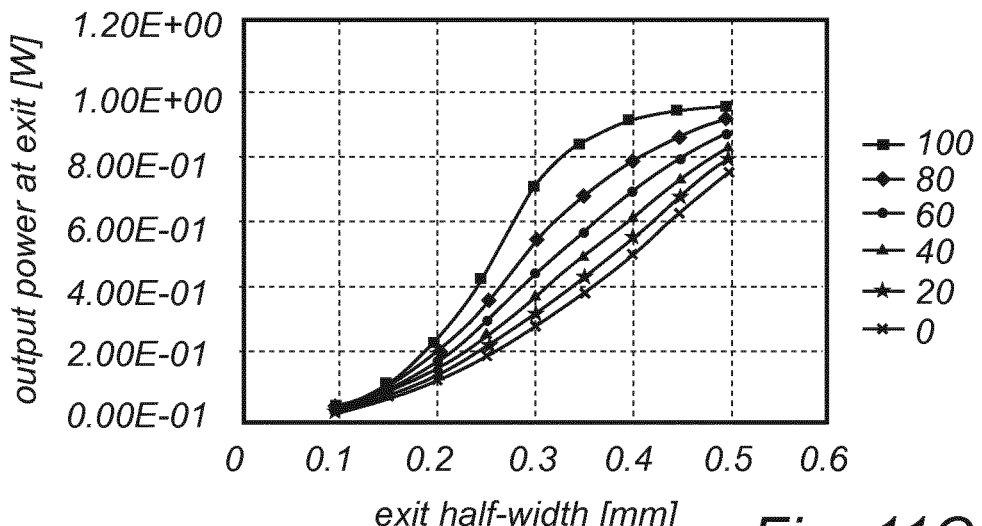
FIG. 11C shows the exit flux as a function of the light guide output surface area for various source reflectance of the optical wedge of FIG. 11A.

Measurements of the effect of two exemplary light emitting devices of the type shown in FIG. 9 are illustrated in FIGS. 10 and 11, respectively, and are described in detail above.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising: a plurality of LEDs, each LED of said plurality of LEDs comprising a LED output surface and being arranged to, in operation, emit light from said LED output surface, a light guiding element comprising a light guide input surface being arranged adjacent said LED output surface of each LED of said plurality of LEDs such that said light emitted by said plurality of LEDs is injected into the light guiding element at said light guide input surface, said light guiding element further comprising a light guide output surface, said light being injected into the light guiding element at said light guide input surface further being guided to and emitted from said light guide output surface, and a collimating element made of a transparent material and comprising a first surface section arranged adjacent said light guide output surface, and said collimating element being adapted to collimate light emitted from said light guide output surface of said light guiding element and injected into said collimating element at said first surface section, wherein the light emitting device further comprises a first reflective element arranged such as to enclose at least said light guiding element at least partially, wherein said collimating element comprises a second surface section, the second surface section adapted to internally reflect the light injected at the first surface section; wherein the first reflective element is adapted to reflect back at least part of the light that leaks out of the light guiding element and at least part of this light is injected into said collimating element at said second surface section; and wherein the collimating element is shaped to separate the first surface section from a periphery of the second surface section.

2. A light emitting device according to claim 1, wherein the light guiding element is an optical wedge.

3. A light emitting device according to claim 2, wherein the light guiding element comprises a refractive index of at least 1.5 and the area of said light guide output surface amounts to 25% to 64% of the area of said light guide input surface.

4. A light emitting device according to claim 2, wherein the light guiding element comprises a refractive index of 1.5 and the area of said light guide output surface amounts to any one of 25% to 64% of the area of said light guide input surface.

5. A light emitting device according to claim 2, wherein the light guiding element comprises a refractive index of 1.8 and the area of said light guide output surface amounts to any one of 25% to 49% of the area of said light guide input surface.

6. A light emitting device according to claim 1, wherein the area of said light guide input surface is larger than the area of said light guide output surface.

7. A light emitting device according to claim 6, wherein said light guide input surface comprises a plurality of light guide input surfaces and wherein the sum of the areas of said plurality of light guide input surfaces is larger than the area of said light guide output surface.

8. A light emitting device according to claim 1, wherein said light guiding element comprises at least two light guide input surfaces, each of said at least two light guide input surfaces being arranged adjacent the LED output surface of at least one LED of said plurality of LEDs such that said light emitted by said plurality of LEDs is injected into the light guiding element at said at least two light guide input surfaces, said light being injected into the light guiding element at each of said two light guide input surfaces further being guided to and emitted from said light guide output surface.

9. A light emitting device according to claim 8, wherein the light guiding element is an optical manifold.

10. A light emitting device according to claim 1, wherein said plurality of LEDs is arranged on a carrier, and wherein at least one LED of said plurality of LEDs is arranged such that the LED output surface extends in an angle with respect to the adjacent light guide input surface.

11. A light emitting device according to claim 10, wherein said carrier is shaped in such a way that at least one LED of said plurality of LEDs is arranged such that the LED output surface extends in an angle different from zero with respect to the adjacent light guide input surface.

12. A light emitting device according to claim 1, wherein said first reflective element further is arranged such as to enclose at least one of said plurality of LEDs and said collimating element at least partially.

13. A light emitting device according to claim 1, wherein at least one LED of said plurality of LEDs is arranged such that the LED output surface extends in an angle different from zero with respect to the adjacent light guide input surface.

14. A light emitting device according to claim 1, wherein at least two adjacent LEDs of said plurality of LEDs are separated by means of at least one second reflective element.

15. A lamp, a luminaire, or a lighting system comprising a light emitting device according to claim 1.

* * * * *